United States Patent
Seabloom et al.

(10) Patent No.: US 12,406,211 B2
(45) Date of Patent: Sep. 2, 2025

(54) ASSET MANAGEMENT FOR UTILITY SYSTEM MAINTENANCE

(71) Applicant: Landis+Gyr Innovations, Inc., Alpharetta, GA (US)

(72) Inventors: Jeff Seabloom, Shafer, MN (US); John Radgowski, Midlothian, VA (US)

(73) Assignee: Landis+Gyr Technology, Inc., Alpharetta, GA (US)

( * ) Notice: Subject to any disclaimer, the term of this patent is extended or adjusted under 35 U.S.C. 154(b) by 262 days.

(21) Appl. No.: 17/849,213

(22) Filed: Jun. 24, 2022

(65) Prior Publication Data
US 2022/0414556 A1 Dec. 29, 2022

Related U.S. Application Data (60) Provisional application No. 63/214,992, filed on Jun. 25, 2021.

(51) Int. Cl.
  *G06Q 10/04* (2023.01)
  *G06Q 10/087* (2023.01)
  *G06Q 10/20* (2023.01)

(52) U.S. Cl.
  CPC ........... *G06Q 10/04* (2013.01); *G06Q 10/087* (2013.01); *G06Q 10/20* (2013.01)

(58) Field of Classification Search
  None
  See application file for complete search history.

(56) References Cited

U.S. PATENT DOCUMENTS

| | | | | |
|---|---|---|---|---|
| 9,252,633 | B2* | 2/2016 | Acharya | H02J 13/00001 |
| 2008/0255892 | A1* | 10/2008 | Orangi | G06Q 10/063 705/7.11 |
| 2009/0070168 | A1* | 3/2009 | Thompson | G06Q 50/06 705/412 |
| 2012/0166249 | A1* | 6/2012 | Jackson | G06Q 10/0635 705/7.28 |

(Continued)

FOREIGN PATENT DOCUMENTS

EP 3537352 A1 9/2019

OTHER PUBLICATIONS

International Application No. PCT/US2022/034951, International Search Report and Written Opinion mailed on Oct. 10, 2022, 11 pages.

*Primary Examiner* — Fateh M Obaid
(74) *Attorney, Agent, or Firm* — Kilpatrick Townsend & Stockton LLP

(57) ABSTRACT

A system includes a processor and a non-transitory, computer-readable memory that includes instructions executable by the processor for causing the processor to perform operations. The operations include receiving a query including an asset inventory or maintenance question of an asset of a power distribution network. The operations further include accessing data of the power distribution network that is associated with the asset and applying a forecasting model to the query and the data of the power distribution network that is associated with the asset to generate an asset inventory or maintenance forecast. Additionally, the operations include controlling an ordering operation of the asset or a maintenance scheduling of the asset using the asset inventory or maintenance forecast.

18 Claims, 7 Drawing Sheets

(56) References Cited

U.S. PATENT DOCUMENTS

| | | | | |
|---|---|---|---|---|
| 2012/0266209 A1* | 10/2012 | Gooding | ............... | H04L 63/20 |
| | | | | 726/1 |
| 2013/0262654 A1* | 10/2013 | Masli | .................... | G06Q 10/04 |
| | | | | 709/224 |
| 2013/0268136 A1* | 10/2013 | Cox | ...................... | H02J 3/144 |
| | | | | 700/295 |
| 2014/0039683 A1* | 2/2014 | Zimmermann | ..... | G06F 11/3044 |
| | | | | 700/275 |
| 2014/0277788 A1* | 9/2014 | Forbes, Jr. | ........ | H02J 13/00034 |
| | | | | 700/286 |
| 2014/0278713 A1* | 9/2014 | Zivelin | ............ | G06Q 10/06313 |
| | | | | 705/7.25 |
| 2014/0330749 A1* | 11/2014 | Candas | ................. | G06Q 40/06 |
| | | | | 705/36 R |
| 2015/0253367 A1* | 9/2015 | Flammer, III | .......... | H04L 67/51 |
| | | | | 324/76.77 |
| 2016/0009304 A1* | 1/2016 | Kumar | ................... | B61L 27/40 |
| | | | | 701/19 |
| 2017/0220708 A1* | 8/2017 | He | .......................... | G01W 1/12 |
| 2018/0012166 A1* | 1/2018 | Devadas | .......... | G06Q 10/06315 |
| 2019/0067946 A1* | 2/2019 | Pan | ....................... | G06Q 50/06 |
| 2019/0383864 A1* | 12/2019 | Joshi | ........................ | H02J 3/00 |
| 2020/0110596 A1* | 4/2020 | Niininen | ................... | G06F 8/70 |
| 2020/0111011 A1* | 4/2020 | Viswanathan | ......... | G06N 20/10 |
| 2020/0118053 A1* | 4/2020 | Chapin | ............. | G06Q 10/06315 |
| 2020/0209841 A1 | 7/2020 | Srinivasan et al. | | |
| 2020/0364636 A1 | 11/2020 | Bertoni Scarton et al. | | |
| 2021/0351612 A1* | 11/2021 | Fannin | ................... | G01R 31/40 |
| 2022/0230125 A1* | 7/2022 | Vedantam | ....... | G06Q 10/063114 |

\* cited by examiner

ASSET MANAGEMENT FOR UTILITY SYSTEM MAINTENANCE

CROSS-REFERENCE TO RELATED APPLICATIONS

The present disclosure claims priority to U.S. Provisional Application Ser. No. 63/214,992 for "ASSET MANAGEMENT FOR UTILITY SYSTEM MAINTENANCE," filed Jun. 25, 2021, which is incorporated by reference herein in its entirety.

TECHNICAL FIELD

The present disclosure is generally related to maintenance of a resource distribution system. More particularly, but not by way of limitation, the present disclosure is related to asset management operations relating to the maintenance and inventory level management of the resource distribution system.

BACKGROUND

In a resource distribution system, such as an electric grid that delivers electric power, various assets used as components of the electric grid have average usable lifespans that are known. For example, the average usable lifespan of transformers installed in the grid may generally be known. Based on the average usable lifespans of grid components, a utility may estimate a quantity of the grid components that the utility may replace over a period of time.

Demands on a grid may change over time, such as with the advent of new technology that changes consumption patterns of the resources provided by the utility. Because of the changing demands, average usable lifespans of grid components may change. Accordingly, a quantity and type of replacements for spent grid components may also change over time. For example, a transformer of a different size may be used to replace a burnt-out transformer based on current grid demands. Accurate forecasting of the timing of grid component replacement and changes to the grid demands may be useful in driving the management of utility assets in a resource distribution system.

SUMMARY

In one implementation, a system includes a processor and a non-transitory, computer-readable memory that includes instructions executable by the processor for causing the processor to perform operations. The operations include receiving a query associated with an asset of a power distribution network. The operations further include accessing data of the power distribution network that is associated with the asset. The data includes an indication of historical usable lifetimes of similar assets, device loads of the asset, information gathered from sensors of the power distribution network, growth trends of the power distribution network, or any combination thereof. Further, the operations include applying a forecasting model to the query and the data of the power distribution network that is associated with the asset to generate an asset inventory or maintenance forecast. Additionally, the operations include controlling an ordering operation of the asset or a maintenance scheduling of the asset using the asset inventory or maintenance forecast.

In another implementation, a non-transitory computer-readable medium may include instructions that are executable by a processor for causing the processor to perform operations. The operations include receiving a query that includes an asset inventory or maintenance question of an asset of a power distribution network. Additionally, the operations include accessing data of the power distribution network that is associated with the asset. The data includes an indication of historical usable lifetimes of similar assets, device loads of the asset, information gathered from sensors of the power distribution network, or any combination thereof. Further, the operations include applying a forecasting model to the query and the data of the power distribution network that is associated with the asset to generate an asset inventory or maintenance forecast. Furthermore, the operations include controlling an ordering operation of the asset or a maintenance scheduling of the asset using the asset inventory or maintenance forecast.

In another implementation, a computer-implemented method includes receiving, at a computing device, a query that includes an asset inventory or maintenance question of an asset of a power distribution network. The method also include accessing, by the computing device, data of the power distribution network that is associated with the asset. Additionally, the method includes applying, by the computing device, a forecasting model to the query and the data of the power distribution network that is associated with the asset to generate an asset inventory or maintenance forecast.

BRIEF DESCRIPTION OF THE DRAWINGS

These and other features, aspects, and advantages of the present disclosure are better understood when the following Detailed Description is read with reference to the accompanying drawings.

DETAILED DESCRIPTION

The present disclosure describes techniques for providing asset management relating to maintenance of a resource distribution system. In an example, asset management of grid components in a resource distribution system may be provided using an Enterprise Resource Planning (ERP) system. ERP systems may refer to integrated management systems for business processes. An ERP system may operate in real time using collected data associated with a business. The data may be processed by the ERP system using enterprise-specific data models. In such an example, data collected from the resource distribution system, such as an electricity grid, may be used by the ERP system to forecast maintenance events and need for additional physical assets of the resource distribution system at future time periods.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

Figure 1:
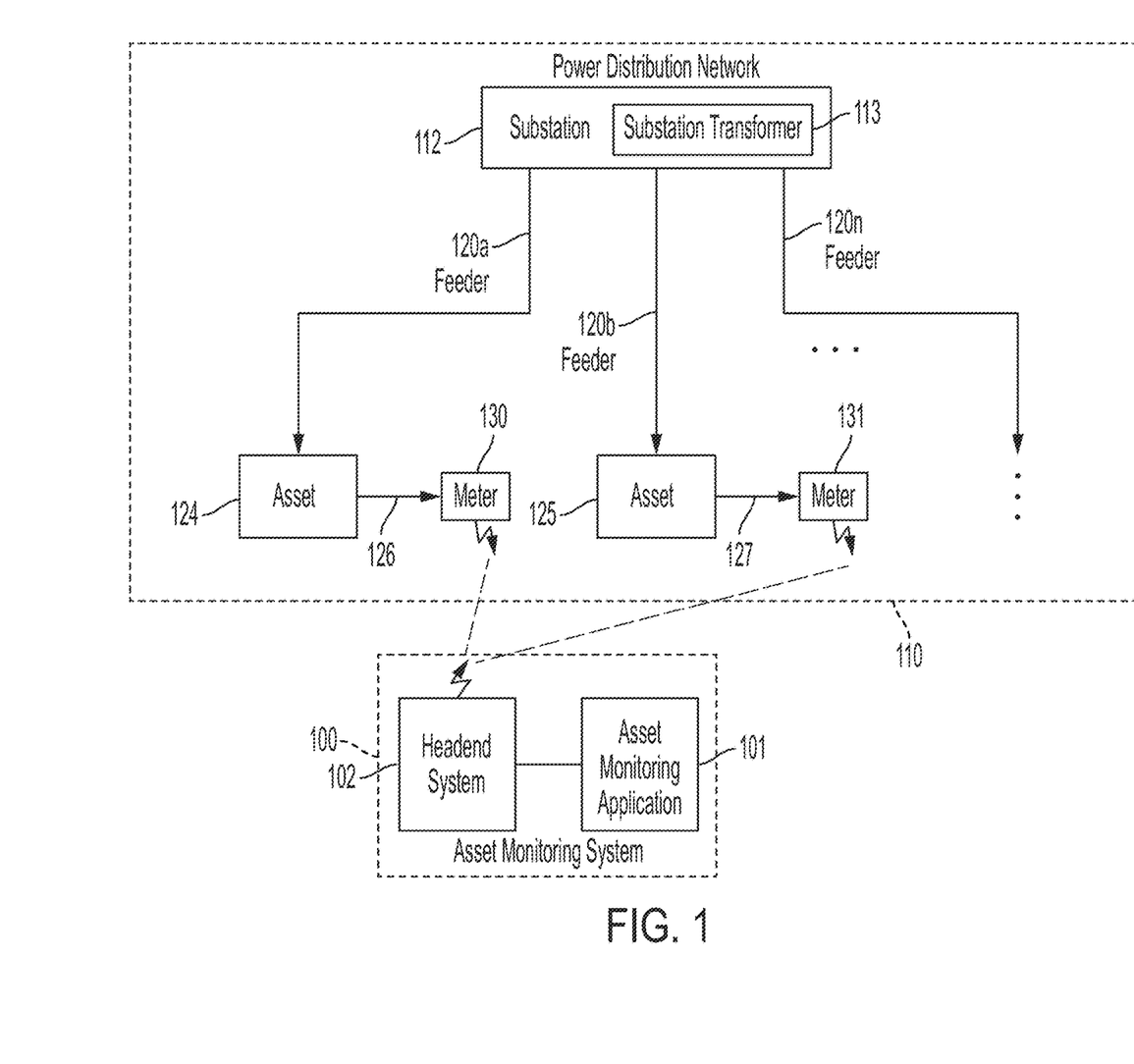
FIG. 1 illustrates an exemplary physical topology of a power distribution network showing devices at various points, or nodes, on the network, according to some implementations described herein.

FIG. 1 illustrates an exemplary physical topology of a power distribution network showing devices at various points, or nodes, on the network. FIG. 1 depicts an asset monitoring system 100 and a power distribution network 110. The asset monitoring system 100 receives information from endpoint meters in the power distribution network 110 and determines the operational status of assets on the power distribution network 110. While the asset monitoring system 100 and the power distribution network 110 are described herein as a being part of a power distribution environment, other utility systems may incorporate similar asset monitoring systems 100. For example, the asset monitoring system 100 may be employed in a gas, water, or other utility distribution environment.

Figure 7:
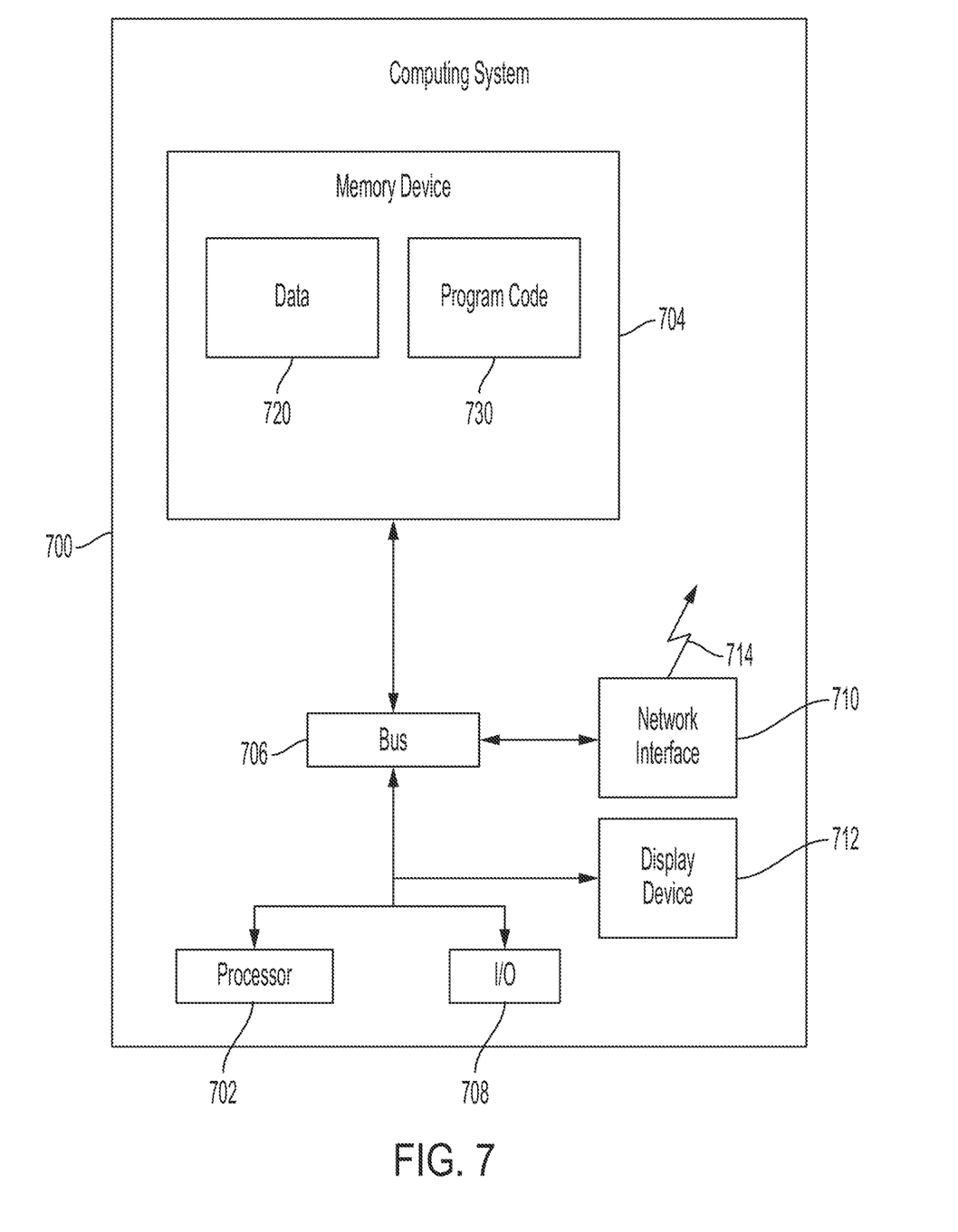
FIG. 7 is an exemplary computing device used for an asset-monitoring application, according to some implementations described herein.

The asset monitoring system 100 includes an asset monitoring application 101 and a headend system 102. The asset monitoring application 101 executes on a computing device as depicted in FIG. 7. The asset monitoring application 101 can receive metering data such as voltage, load, power consumption, etc., from meters that are installed at customers' premises. Other data from other data points may also be provided to the asset monitoring application 101. In conjunction with network topology information, the asset monitoring application 101 can determine the operating status of assets within the power distribution network 110. The asset monitoring application 101 receives metering data from the headend system 102 or through an intermediary that reads and aggregates the metering information. The meters may communicate metering information to the headend system via additional network devices and networks, which are not shown in the figures for simplicity. In some examples, the communications operations within the power distribution network 110 may be performed using radio frequency (RF) wireless communications, cellular communications, power line communication (PLC) communications, or any other suitable communications technology.

The power distribution network 110 includes a substation 112 and one or more feeders 120a-n. The substation 112 distributes power received from an electricity source to feeders 120a-n. Examples of electricity sources include coal plants, wind turbines, and solar panel installations. The substation 112 can include a substation transformer 113. The substation transformer 113 steps down a voltage provided to the substation 112 and outputs a lower voltage to the feeders 120a-120n. The substation 112 can distribute multiple phases (e.g., three phases) of power. While a single substation 112 is depicted in FIG. 1, the power distribution network 110 may include a plurality of similar substations.

Each feeder 120a-n may include one or more assets, such as assets 124 or asset 125. The assets 124 or 125 may provide power to lateral lines, or laterals. The power distribution network 110 includes lateral 126 electrically coupled to the asset 124 and lateral 127 electrically coupled to asset 125. The assets 124 and 125 can be devices such as on-load tap changers (OTLCs), transformers, voltage regulators, capacitor banks, or other grid edge assets positionable within the power distribution network 110. The lateral 126 provides power to a meter 130, and the lateral 127 provides power to a meter 131.

Each asset performs a function on the distribution network. For example, transformers 113 step down a voltage from the substation. In an example, the voltage step down from the substation may be from 10 kV to a lower voltage, such as 240 V. Other step down ranges may also be performed by the transformers 113. Capacitor banks, which may be the assets 124 and 125, provide increased reactive power to endpoint nodes that are connected to a respective feeders 120a-n. Voltage regulators and OTLCs, which may also be the assets 124 and 125, may ensure that voltages on lateral lines remain within a predefined range regardless of load.

The asset-monitoring application 101, which may be a form of Enterprise Resource Planning (ERP) system, may derive a set of parameters derived from advanced metering infrastructure with a set of expected parameters derived from a power flow calculation. Methods used by the asset monitoring application 101 vary by target asset. For example, the method used to determine the operation of a capacitor bank differs from the methods used to determine the operation of a distribution transformer. In an example, the asset monitoring application 101 may determine the condition (e.g., operational, non-operational, predicted remaining usable life, etc.) of a particular target asset. For example, the asset monitoring application 101 may leverage data obtained from the meters 130 and 131 and other data sources in the power distribution network 110 to predict the condition of assets in the power distribution network 110. In an example, the asset monitoring application 101 may apply machine-learning models to the data obtained from the power distribution network 110 to generate predicted indications of asset conditions and forecasts for asset replacements. In some examples, new machine-learning models may be generated and trained for the purposes described herein. In other examples, data obtained from the power distribution network 110 may be fed to existing machine-learning models, such as straight-line models, moving average models, linear regression models, etc.

In additional examples, an Adaptive Network-Based Fuzzy Inference System may be used to predict transformer loss of life or loss of life of other components of the power distribution network 110. Additionally, a Supervised Regression Machine Learning model or Reinforcement Learning Model may be used for similar purposes. These models may all use similar datasets that include sensor data and user generated data along with weather data and inventory data. For example, historical AMI, weather, and inventory data may be used along with a Reinforcement Learning model to determine the optimal inventory levels based upon predicted future loading and weather data.

Using predicted conditions of the assets and forecasts for asset replacements, the asset-monitoring application 101 may be used in predictive and preventative maintenance scheduling, fault prevention, damage prevention, or any other asset management operations for the power distribution network 110. Additionally, the asset-monitoring application 101 may be used for inventory maintenance of assets within the power distribution network 110. Maintaining the appropriate level of assets in the inventory may streamline maintenance operations and limit unnecessary excess asset inventory.

In an example, the machine-learning models of the asset monitoring application 101 may be trained based on historical data of the power distribution network 110. For example, the present state of the power distribution network 110 may be used as a representation of a ground-truth state. The machine-learning model may be trained in such a way that the historical data provided to the machine-learning model would result in an output that matches the representation of the ground-truth state. As the state of the power distribution network 110 evolves over time, the machine-learning model may be further trained with additional data points and additional ground-truth states.

In some examples, the trained machine-learning model of the asset-monitoring application 101 may be trained to forecast future states of the power distribution network 110. For example, the machine-learning model may utilize trends of the data provided by nodes in the power distribution network 110 over time to predict asset and maintenance needs of the power distribution network 110 at future points in time. These forecasts may enable the utility to maintain adequate quantities and types of assets and to maintain maintenance scheduling. The assets may include any asset or asset group that is material to the power distribution network 110. For example, the assets may include poles, consumables, wire, nuts, bolts, screws, tools, etc. in addition to other consumable components of the power distribution network 110, such as transformers. In some examples, predictions of the future state of the power distribution network 110 may also take into account planned technological developments that may alter the usefulness of presently available assets. For example, transformer technology may change over time, and the predictions of the future state of the power distribution network 110 may account for predictions of such changes to the transformer technology when determining inventory management needs for the transformers in the future.

Figure 2:
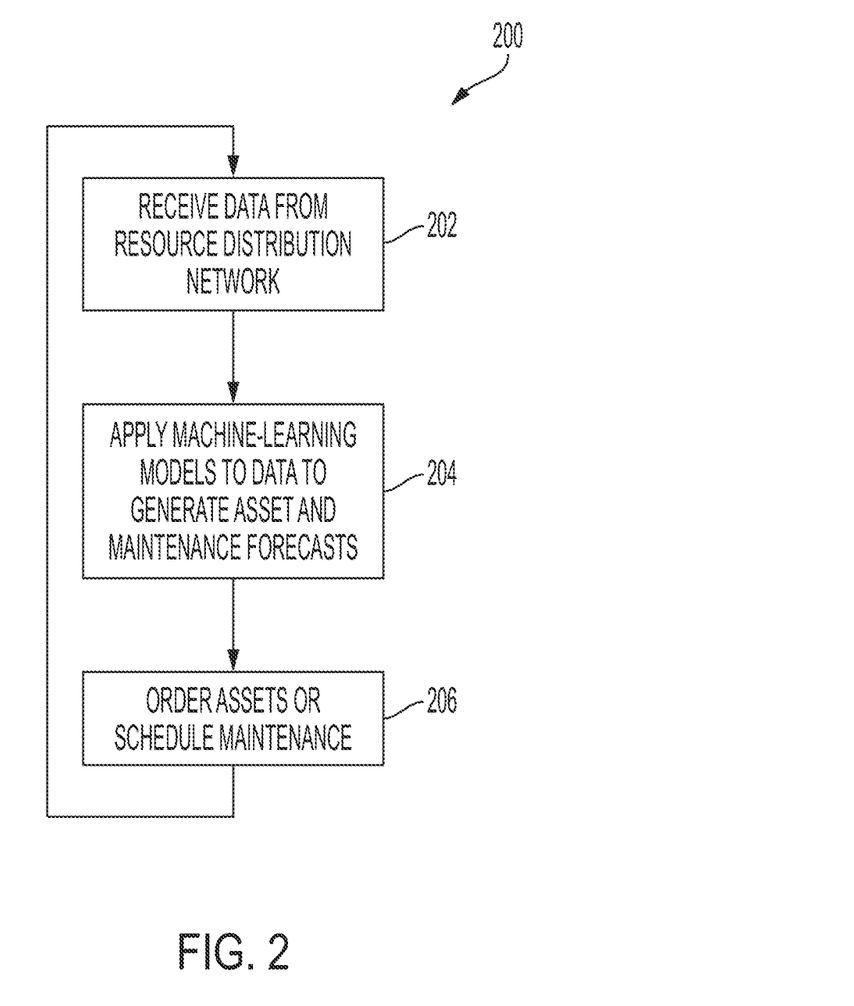
FIG. 2 is a flowchart of a process for implementing an asset-monitoring application to streamline asset management operations of the power distribution network of FIG. 1, according to some implementations described herein.

FIG. 2 is a flowchart of a process 200 for implementing the asset-monitoring application 101 to streamline asset management operations of the power distribution network 110. At block 202, the process 200 involves receiving data from a resource distribution network, such as the power distribution network 110. The data may be received at the headend system 102 from metering devices 130 and 131 or from any other data collection points within the resource distribution network, such as substation transformer loading data, voltage regulator data, load tap changer data, drones providing visual inspection of components (e.g., poles, nuts, bolts, etc.) of the power distribution network 110, historical usable lifespans of similar devices, etc. In some examples, the term similar devices may refer to a device of a similar type to a particular asset and operated under similar conditions as the particular asset. Some data may be automatically collected by the meters 130 and 131, and other data may be collected manually in response to maintenance operations. For example, manually collected data may include an indication of a burnt-out transformer or a missing or broken mechanical component in the power distribution network 110.

At block 204, the process 200 involves applying machine-learning models to the collected data to generate asset and maintenance forecasts. The machine-learning models, which may be a component of an ERP system of the asset-monitoring application 101, may be trained to forecast asset and maintenance needs associated with the power distribution network 110 in response to specific data inputs from the power distribution network 110. For example, power consumed through the substation transformer 113 may be an input to a machine-learning model that contributes to a prediction for when the substation transformer 113 will need replacement. In such an example, more power consumed through the substation transformer 113 may lead to a shorter remaining useful life of the substation transformer 113 when compared to other transformers where less power is consumed through the other transformers. Accordingly, the machine-learning model may leverage such knowledge to accurately predict when the substation transformer 113 is expected to burn out based on load conditions through the substation transformer 113. Additionally, numbers of new meters brought online within the power distribution network 110 may be data that is leveraged by the machine-learning models to forecast future asset needs due to a predicted increase in power demand.

At block 206, the process 200 involves ordering new assets, scheduling maintenance on assets within the power distribution network 110, or both. In an example, the machine-learning models of the asset-monitoring application 101 may forecast when certain assets will reach the end of their usable lifecycle. To avoid prolonged downtimes, the asset-monitoring application 101 may initiate an order sequence for a new asset to replace the end-of-lifecycle asset. Additionally, the asset-monitoring application 101 may schedule maintenance to repair or replace broken or end-of-lifecycle assets. In additional examples, the asset-monitoring application 101 may use the output of the machine-learning models to ensure that asset inventories are sufficient for forecasted asset needs based on the data obtained from the resource distribution network.

In some examples, the process 200 may be implemented at any utility with a sensor network that provides sensed data. The sensed data from the sensor network may be leveraged by the machine-learning models to forecast maintenance and asset needs for the utility. The utility implementing the process 200 may include an electric utility, a water utility, a gas utility, a district heat utility, or any other utility system with a sensor network.

Figure 3:
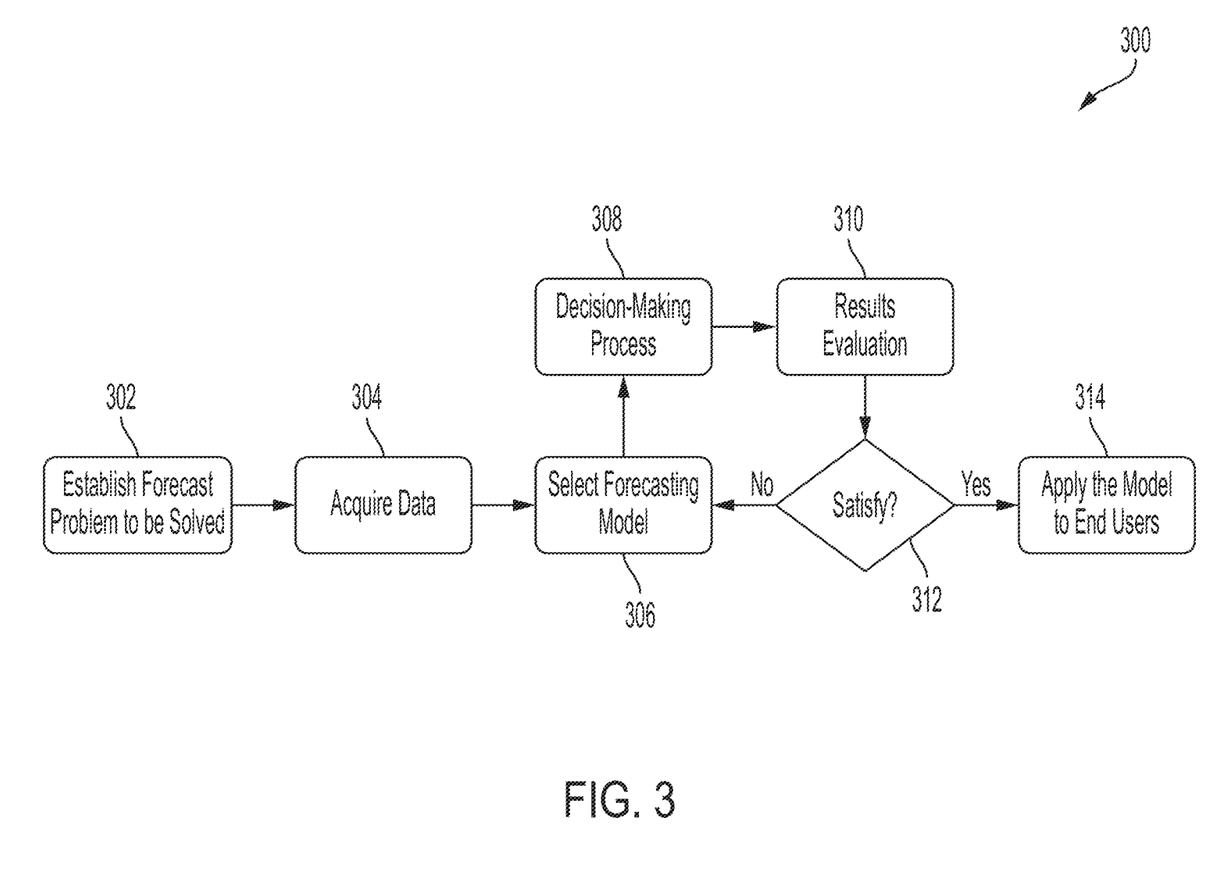
FIG. 3 is a flowchart of a process for implementing additional aspects of the asset-monitoring application to streamline inventory maintenance operations of the power distribution network of FIG. 1, according to some implementations described herein.

FIG. 3 is a flowchart of a process 300 for implementing additional aspects of the asset-monitoring application 101 to streamline inventory maintenance operations of the power distribution network 110. At block 302, the process 300 involves establishing a forecast problem to be solved. For example, the forecast problem may be a forecast of a quantity and type of a particular asset that may be desirable to have in inventory at a specified future date. By forecasting the quantity and type of the particular asset, the asset inventories of the power distribution network 110 may be maintained in a manner that limits network downtime while parts are ordered.

At block 304, the process 300 involves acquiring data to support asset inventory maintenance. The data may include timing information regarding the usable lifetime of an asset (e.g., detected time between asset replacement across the network), device loads, or any other information that may contribute to inventory maintenance, such as information gathered from sensors of the power distribution network 110. In some examples, the device loads may refer to power consumed by loads through a particular asset of the power distribution network 110. Further, the data may be collected from the power distribution network 110 or from other power distribution networks.

At block 306, the process 300 involves selecting a forecasting model. For example, a particular forecasting model may be the most relevant model to a particular asset of the power distribution network 110. In some examples, each forecasting model may be trained for a different asset of the power distribution network 110, and the forecasting model may be selected based on the asset of the power distribution network 110 for which a forecast is desired.

In additional examples, the forecasting models may all be trained to solve the same problem (e.g., issues associated with an asset), but one forecasting model may be better suited for the particular power distribution network 110. For example, one forecasting model may be trained using a large amount of data obtained from a cold-climate power distribution network, while the power distribution network 110 is located in a warm climate. Accordingly, the forecasting model trained with cold climate data may not be as accurate as another forecasting model that was trained with data that more closely aligns with the warmer climate of the power distribution network 110.

At block 308, the process 300 involves using the selected forecasting model with the data acquired at block 304. In an example, the selected forecasting model, which may be one of the machine-learning models described above, may be pre-trained based on a corpus of data generated from the assets in the power distribution network 110, a corpus of data generated from assets in other power distribution networks, or a combination of thereof. The selected forecasting model may be applied to the data acquired at block 304, such as data specific to a particular asset for which the forecast is desirable, to generate a forecast output of the particular asset.

At block 310, the process 300 involves evaluating the results of the forecasting model. In an example, evaluating the results of the forecasting model may be performed when the forecasting model is applied to historical ground-truth data for a particular query (e.g., the forecast problem to be solved). In such an example, the output of the forecasting model may be compared to a known result of the ground-truth data to determine accuracy of the forecasting model for solving the forecast problem established at block 302.

If, at block 312, the results are deemed satisfactory, then the process 300 proceeds to block 314 where the forecasting model is applied for maintaining asset inventory levels. If the results are not deemed satisfactory, then the process 300 proceeds to block 306 where a new forecasting model is selected in an attempt to generate better results. In an example, the results may be deemed satisfactory when the results are within 1% of the ground-truth results for the data. Other percentages that are greater or smaller than 1% may also be used to determine if the results are satisfactory.

Grid Mapping

In some examples, the asset monitoring systems 100 described above with respect to FIG. 1 may use the data collected from a sensor network to map a layout of the utility grid. The asset monitoring systems 100 may use the mapped utility grid layout to predict future revenue sources and to provide another data point or set of data points that can be leveraged for further forecasting of grid maintenance and asset inventory needs.

Figure 4:
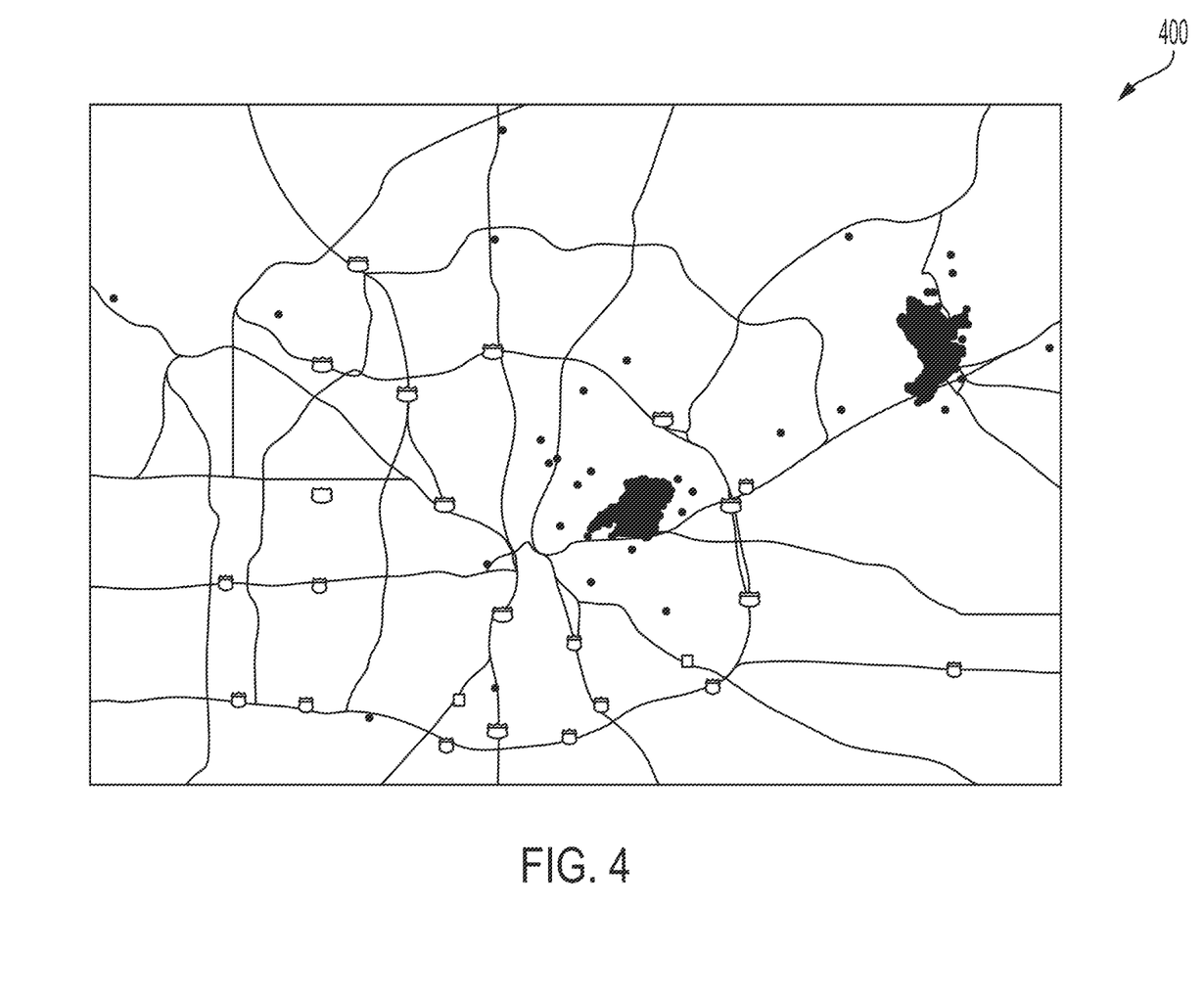
FIG. 4 is an exemplary output of the asset-monitoring application showing a map of location information for a number of meters for a particular utility, according to some implementations described herein.

FIG. 4 is an exemplary output of the asset monitoring application 101 showing a map 400 of location information for a number of meters for a particular utility. The majority of the meters are found to be clustered together around a substation or located along a distribution line. Locations of meters may be used to provide information about components of the power distribution network 110. For example, the locations of the meters may be used to determine length of wires, trending growth of the distribution area, or other information associated with the power distribution network 110. The data collected based on the mapped grid information may be used by the asset monitoring application 101 for predictive maintenance, inventory management, and asset demand forecasting, as discussed above.

In some examples, the layout of the utility grid may be used to identify under-utilized assets. That is, using the information from the locations of assets on the power distribution network 110, the asset monitoring application 101 may determine components with additional capacity. In other examples, the asset monitoring application 101 may use this information to determine overloaded grid components or grid components that are approaching capacity.

Additionally, mapping the location of grid components may drive the asset inventory management operations. For example, the map 400 may provide an indication of an asset environment of a particular grid component. In an example, the particular grid component may be located in a swampy area, and the map 400 may identify the swampy area. In some examples, the map 400 may include polygons that are assigned environmental conditions, such as swampy areas, desert areas, coastal areas, etc. If the particular grid component is mapped to a polygon associated with an environmental condition, then replacements for the particular grid component may be made based on the expected environmental condition associated with the location of the particular grid component. Because of the data indicating that the grid component, such as a pole, is located in a swampy area polygon of the map 400, a different type of component (e.g., a metal pole instead of a wooden pole) may be maintained in inventory or ordered as a replacement for that grid component in the future. Similarly, the map 400 may provide an indication that a particular grid component is located in a desert area prone to dry conditions and high heat. Because of the data indicating that the grid component, such as an asset that is prone to damage from overheating, is located in an area that experiences high heat, a different type of component (e.g., one with enhanced heat management features) may be maintained in inventory as a replacement for that grid component in the future. Further, maintaining inventory of grid components that are not usable in the swampy areas, in hot areas, in coastal areas, etc. is also avoided when using this information for asset inventory forecasting.

In some examples, data associated with a time lapse of the map 400 may be used to identify trends associated with the power distribution network 110. For example, the map 400 may identify portions of a city experiencing a significant population increase by tracking new meters that are added to the power distribution network 110 in those areas. In additional examples, the trends may represent general population increases in areas served by the power distribution network 110. In either instance, the trends may be used as data inputs to a forecasting model, such as a machine-learning model, for use in forecasting asset inventory in particular locations. For example, assets of the power distribution network 110 may be ordered or redistributed to other locations based on predicted demand for those assets in the regions experiencing growth, as indicated by the trends of the map 400.

While the discussion above is generally associated with a power distribution network 110, similar techniques may be used for other resource distribution systems. For example, similar techniques may be used with water distribution systems, gas distribution systems, or any other systems used in the distribution of resources. When implementing the techniques described above with other resource distribution systems, data associated with users, operators, meters, and assets of a service may all contribute to predictive maintenance scheduling and asset inventory forecasting. Further, information gathered from one distribution system (e.g., a water distribution system) may contribute to forecasting operations for another distribution system (e.g., the power distribution network 110).

Exemplary Machine-Learning Environments

Figure 5:
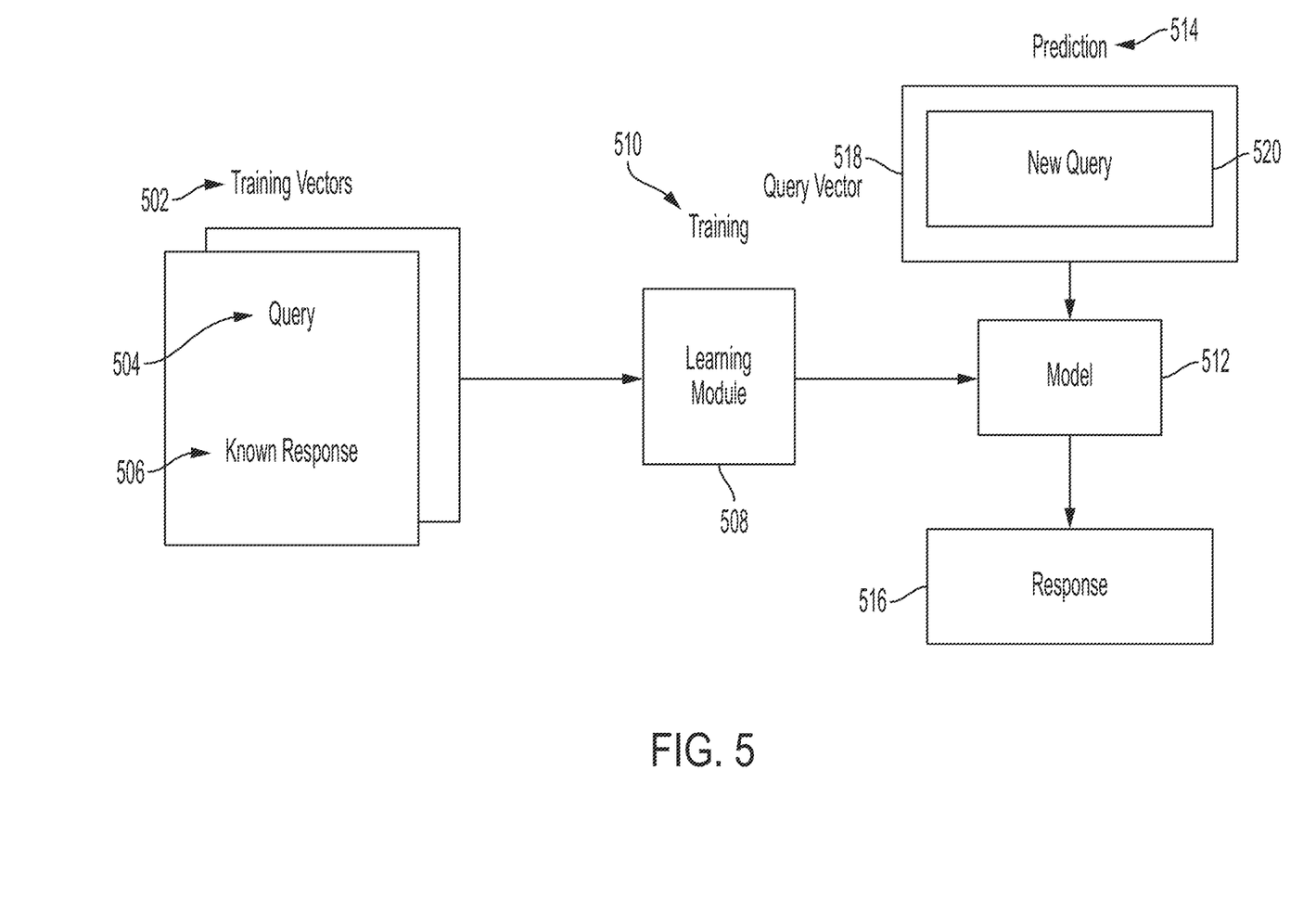
FIG. 5 is an example of a machine learning model environment used to perform asset management operations, according to some implementations described herein.

FIG. 5 is an example of a machine learning environment used to perform asset management operations, according to some implementations described herein. Training vectors 502 are shown with query 504 and a known response 506. As examples, a query could be a request for information about an asset of the power distribution network 110. For example, the query 504 may be an asset forecast problem to be solved, such as the forecast problem of block 302 described above with respect to FIG. 3. For ease of illustration, only two training vectors 502 are shown, but the number of training vectors may be much larger, e.g., 10, 50, 100, 1,000, 10,000, 100,000, or more.

The training vectors 502 can be used by a learning module 508 to perform training 510 of a model 512. The learning module 508 can optimize parameters of the model 512, such as a machine-learning model, such that a quality metric (e.g., an accuracy of the model 512) is achieved with one or more specified criteria. The accuracy may be measured by comparing the known responses 506 to predicted outputs of the model 512. Parameters of the model 512 can be iteratively varied to increase accuracy. Determining a quality metric can be implemented for any arbitrary function including the set of all risk, loss, utility, and decision functions.

In some embodiments of training, a gradient may be determined for how varying the parameters affects a cost function, which can provide a measurement of accuracy for the current state of the model 512. The gradient can be used in conjunction with a learning step (e.g., a measure of how much the parameters of the model 512 should be updated for a given time step of the optimization process). The parameters (which can include weights, matrix transformations, and probability distributions) can thus be optimized to provide an optimal value of the cost function, which can be measured as being above or below a threshold (i.e., exceeds a threshold) or that the cost function does not change significantly for several time steps, as examples. In other embodiments, training can be implemented with methods that do not require a hessian or gradient calculation, such as dynamic programming or evolutionary algorithms.

A prediction stage 514 can provide a predicted response 516 for a query vector 518 based on a new query 520. The new query 520 can be of a similar type as the query 504 of the training vectors 502. If new query records are of a different type, a transformation can be performed on the data to obtain data in a similar format as the format of the training vectors 502. A predicted response 516 may correspond to the question encoded in the query vector 518. In some examples, the predicted response 516 may be an indication of a usable lifespan for a particular asset of the power distribution network 110. Additionally, the predicted response 516 may be a prediction of inventory levels or to provide maintenance scheduling for a particular asset at a future point in time. The model 512 may also be trained to generate other predictions relevant to Enterprise Resource Planning (ERP) of the power distribution network 110.

The model 512 may include machine-learning models such as deep-learning models, neural networks (e.g., deep-learning neural networks), kernel-based regressions, adaptive basis regression or classification, Bayesian methods, ensemble methods, logistic regression and extensions, Gaussian processes, support vector machines (SVMs), a probabilistic model, and a probabilistic graphical model. Embodiments using neural networks can employ using wide and tensorized deep architectures, convolutional layers, dropout, various neural activations, and regularization steps.

Figure 6:
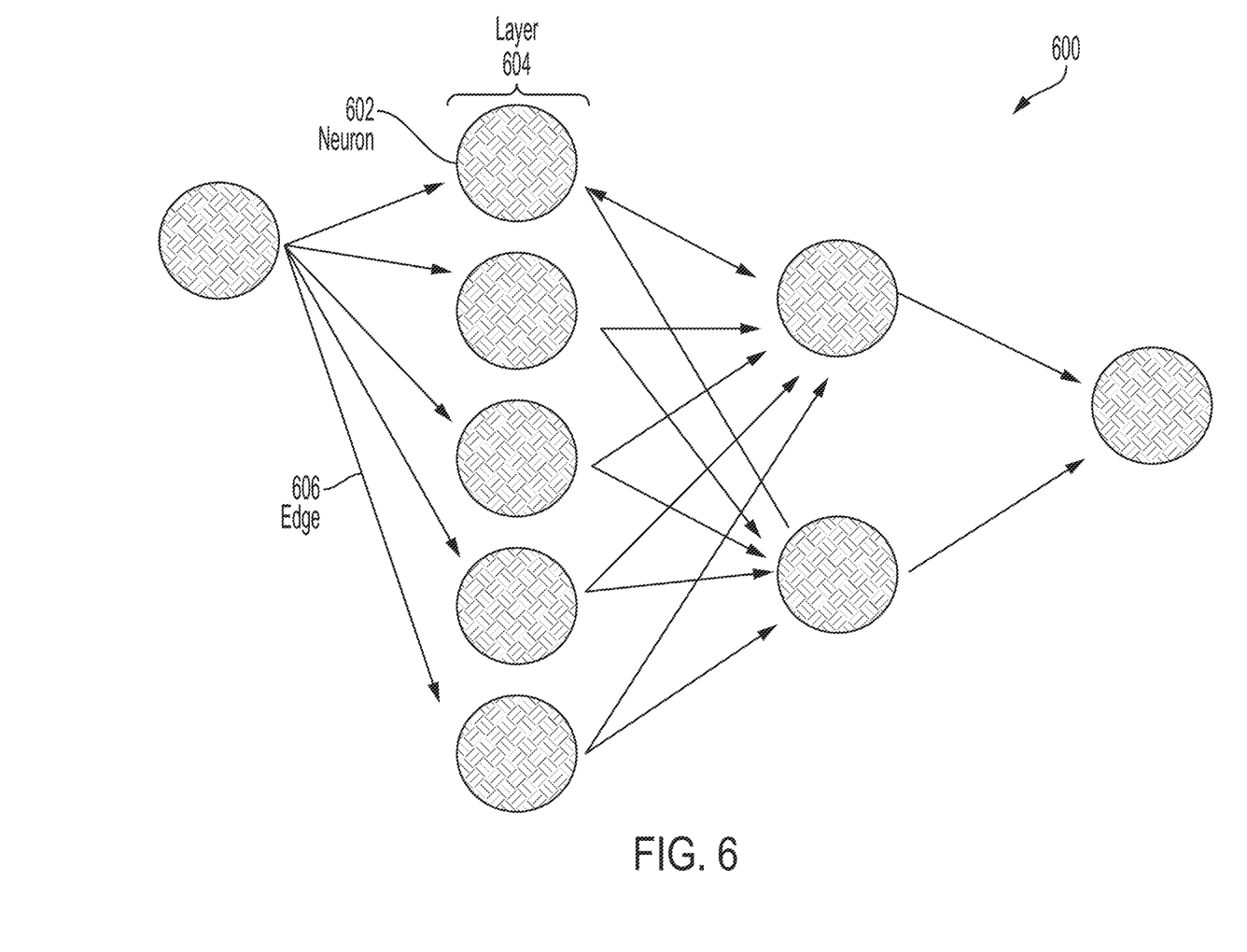
FIG. 6 is an example machine learning model of a neural network, according to some implementations described herein.

FIG. 6 is an example machine-learning model of a neural network 600, according to some implementations described herein. As an example, the model 512 can be the neural network 600 that includes a number of neurons 602 (e.g., adaptive basis functions) organized in layers 604. The neurons 602, or nodes, can be connected by edges 606. The training of the neural network 600 can iteratively search for the best configuration of the parameter of the neural network for feature recognition, classification, and/or prediction performance. Various numbers of layers and nodes may be used. A person with skills in the art can easily recognize variations in a neural network design and design of other machine learning models.

Exemplary Computing Devices Used for Asset Monitoring

FIG. 7 illustrates an exemplary computing device used for an asset-monitoring application, according to some implementations described herein. Any suitable computing system may be used for performing the operations described herein. The depicted example of a computing device 700 includes a processor 702 communicatively coupled to one or more memory devices 704. The processor 702 executes computer-executable program code 730 stored in a memory device 704, accesses data 720 stored in the memory device 704, or both. Examples of the processor 702 include a microprocessor, an application-specific integrated circuit ("ASIC"), a field-programmable gate array ("FPGA"), or any other suitable processing device. The processor 702 can include any number of processing devices or cores, including a single processing device. The functionality of the computing device may be implemented in hardware, software, firmware, or a combination thereof.

The memory device 704 includes any suitable non-transitory computer-readable medium for storing data, program code, or both. A computer-readable medium can include any electronic, optical, magnetic, or other storage device capable of providing a processor with computer-readable instructions or other program code. Non-limiting examples of a computer-readable medium include a flash memory, a ROM, a RAM, an ASIC, or any other medium from which a processing device can read instructions. The instructions may include processor-specific instructions generated by a compiler or an interpreter from code written in any suitable computer-programming language, including, for example, C, C++, C#, Visual Basic, Java, or scripting language.

The computing device 700 may also include a number of external or internal devices, such as input or output devices. For example, the computing device 700 is shown with one or more input/output ("I/O") interfaces 708. An I/O interface 708 can receive input from input devices or provide output to output devices. One or more busses 706 are also included in the computing device 700. The bus 706 communicatively couples one or more components of a respective one of the computing device 700.

The computing device 700 executes program code 730 that configures the processor 702 to perform one or more of the operations described herein. For example, the program code 730 causes the processor to perform the operations described in FIGS. 1-6.

The computing device 700 also includes a network interface device 710. The network interface device 710 includes any device or group of devices suitable for establishing a wired or wireless data connection to one or more data networks. The network interface device 710 may be a wireless device and have an antenna 714. The computing device 700 can communicate with one or more other computing devices implementing the computing device or other functionality via a data network using the network interface device 710.

The computing device 700 can also include a display device 712. Display device 712 can be a LCD, LED, touch-screen or other device operable to display information about the computing device 700. For example, information could include an operational status of the computing device, network status, etc.

While the present subject matter is described in detail with respect to specific aspects thereof, it will be appreciated that those skilled, upon attaining an understanding of the foregoing and the following, may readily produce alternations to, variations of, and equivalents to such aspects. Accordingly, it should be understood that the present disclosure has been presented for purposes of example rather than limitation and does not preclude inclusion of such modifications, variations, and/or additions to the present subject matter as would be readily apparent to one of ordinary skill in the art.

What is claimed is:

1. A system comprising:
   a headend system for communicating with one or more meters, wherein each of the meters is associated with an asset of a power distribution network;
   a processor; and
   a non-transitory, computer-readable memory that includes instructions executable by the processor for causing the processor to:
   receive first data at the headend system from a meter associated with an asset of the power distribution network, wherein the first data comprises metering data comprising one or more of voltage, load, and power consumption;
   identify a power distribution network growth trend by mapping electrical meters of the power distribution network;
   receive a query associated with the asset of the power distribution network;
   access second data of the power distribution network that is associated with the asset, wherein the second data comprises an indication of historical usable lifetimes of similar assets, information gathered from sensors of the power distribution network, the power distribution network growth trend, or any combination thereof, wherein the second data of the power distribution network that is associated with the asset comprises the power distribution network growth trend;
   apply a forecasting model to the query, the first data, and the second data of the power distribution network that is associated with the asset to generate an asset inventory or maintenance forecast; and
   control an ordering operation of the asset and/or a maintenance scheduling of the asset using the asset inventory or maintenance forecast.

2. The system of claim 1, wherein the instructions are further executable by the processor for causing the processor to:
   train the forecasting model to generate the asset inventory or maintenance forecast using training vectors of ground-truth data of a plurality of additional assets of the power distribution network, wherein the forecasting model comprises a machine-learning model.

3. The system of claim 2, wherein the instructions to train the forecasting model are further executable by the processor to:
   train the forecasting model to generate the asset inventory or maintenance forecast using additional training vectors of ground-truth data of a plurality of additional assets of an additional power distribution network.

4. The system of claim 1, wherein the instructions are further executable by the processor for causing the processor to:
   select the forecasting model from a set of forecasting models in response to evaluating an accuracy of the forecasting model in solving the asset inventory or maintenance question of the query.

5. The system of claim 1, wherein controlling the ordering operation of the asset comprises redistributing asset inventories based on the power distribution network growth trend.

6. The system of claim 1, wherein the query comprises an asset inventory or maintenance question associated with an asset of a power distribution network.

7. The system of claim 1, wherein the instructions are further executable by the processor for causing the processor to:
   identify asset environments by mapping assets of the power distribution network, wherein controlling the ordering operation or maintenance scheduling of the asset is based on the asset environments identified by mapping the assets of the power distribution network.

8. A non-transitory, computer-readable medium comprising instructions that are executable by a processor for causing the processor to perform operations comprising:
   receiving first data at a headend system from a meter associated with an asset of a power distribution network, wherein the first data comprises metering data comprising one or more of voltage, load, and power consumption;
   identifying a power distribution network growth trend by mapping electrical meters of the power distribution network;
   receiving a query comprising an asset inventory or maintenance question of the asset of the power distribution network;
   accessing second data of the power distribution network that is associated with the asset, wherein the second data comprises an indication of historical usable lifetimes of similar assets, information gathered from sensors of the power distribution network, or any combination thereof, wherein the second data of the power distribution network that is associated with the asset comprises the power distribution network growth trend;
   applying a forecasting model to the query, the first data, and the second data of the power distribution network that is associated with the asset to generate an asset inventory or maintenance forecast; and controlling an ordering operation of the asset and/or a maintenance scheduling of the asset using the asset inventory or maintenance forecast.

9. The non-transitory, computer-readable medium of claim 8, wherein the operations further include:

training the forecasting model to generate the asset inventory or maintenance forecast using training vectors of ground-truth data of a plurality of additional assets of the power distribution network, wherein the forecasting model comprises a machine-learning model.

10. The non-transitory, computer-readable medium of claim 8, wherein the operations further include:

selecting the forecasting model from a set of forecasting models in response to evaluating an accuracy of the forecasting model in solving the asset inventory or maintenance question of the query.

11. The non-transitory, computer-readable medium of claim 8, wherein controlling the ordering operation of the asset comprises redistributing asset inventories based on the power distribution network growth trend.

12. The non-transitory, computer-readable medium of claim 8, wherein the data of the power distribution network that is associated with the asset comprises an indication of historical usable lifetimes of similar assets to the asset, device loads of the asset, information gathered from sensors of the power distribution network, or any combination thereof.

13. The non-transitory, computer-readable medium of claim 8, wherein the operations further include:

identifying asset environments by mapping assets of the power distribution network, wherein controlling the ordering operation or maintenance scheduling of the asset is based on the asset environments identified by mapping the assets of the power distribution network.

14. A computer-implemented method comprising:

receiving first data at a headend system from a meter associated with an asset of a power distribution network, wherein the first data comprises metering data comprising one or more of voltage, load, and power consumption;

identifying a power distribution network growth trend by mapping electrical meters of the power distribution network;

receiving, at a computing device, a query comprising an asset inventory or maintenance question of the asset of the power distribution network;

accessing, by the computing device, second data of the power distribution network that is associated with the asset, wherein the second data comprises an indication of historical usable lifetimes of similar assets, information gathered from sensors of the power distribution network, or any combination thereof, wherein the second data of the power distribution network that is associated with the asset comprises the power distribution network growth trend; and applying, by the computing device, a forecasting model to the query, the first data, and the second data of the power distribution network that is associated with the asset to generate an asset inventory or maintenance forecast.

15. The computer-implemented method of claim 14, further comprising:

training, by the computing device, the forecasting model to generate the asset inventory or maintenance forecast using training vectors of ground-truth data of a plurality of additional assets of the power distribution network, wherein the forecasting model comprises a machine-learning model.

16. The computer-implemented method of claim 15, wherein training the forecasting model further comprises:

training, by the computing device, the forecasting model to generate the asset inventory or maintenance forecast using additional training vectors of ground-truth data of a plurality of additional assets of an additional power distribution network.

17. The computer-implemented method of claim 14, further comprising:

controlling, by the computing device, an ordering operation of the asset or a maintenance scheduling of the asset using the asset inventory or maintenance forecast.

18. The computer-implemented method of claim 14, further comprising:

identifying, by the computing device, asset environments by mapping assets of the power distribution network, wherein the data of the power distribution network comprises the asset environments.

\* \* \* \* \*